UNITED STATES PATENT OFFICE.

RICHARD FALTER, OF NEW YORK, N. Y.

WATERPROOFING COMPOUND.

No. 856,855.  Specification of Letters Patent.  Patented June 11, 1907.

Application filed February 1, 1906. Serial No. 298,954.

*To all whom it may concern:*

Be it known that I, RICHARD FALTER, a citizen of the United States, residing at New York, in the county of New York and State of New York, have invented a new and useful Waterproofing Compound, of which the following is a specification.

This invention relates generally to the art of rendering fabrics water or moisture proof, and particularly to an improved composition of matter adapted to be suitably applied to one or both sides of a fabric for the purpose specified.

In waterproofing fabrics, it is essential that the ingredients used shall have no injurious effect upon the quality, or color of the fabric; that is to say, it is essential that the ingredients shall not injuriously affect the tensile strength or cause the fabric to fade. Furthermore, it is essential that the waterproofing composition shall be inexpensive to produce as well as practically permanent during the life of the fabric, and not subject to deterioration or chemical change such as will cause it to become sticky or otherwise undesirable in its nature.

The improved composition of this invention satisfies all the above mentioned requirements. It does not injuriously affect the quality, size or color of the fabric, nor is it unduly expensive, difficult to produce; impermanent, or subject to undesirable chemical change.

Specifically stated, the improved composition of matter consists of white ozokerite, yellow ozokerite, mutton tallow and cereate, a substance consisting of lard and white wax. The ingredients are mixed or melted together in any suitable manner, cast in bars and permitted to harden or set. The bars are rubbed on the fabric, or where machines are used, they are suitably held in place and the fabric is drawn thereover, after which the fabric is passed between suitable heated calender rolls to melt and drive the composition into the fabric.

While the above ingredients may be used in any desired proportions, it is usually preferred to mix them in the proportion of seven parts of white ozokerite to one part of yellow ozokerite, one part of mutton tallow and one part of cereate.

The white ozokerite is used principally for its waterproofing qualities and for the reason that it is permanent in its effect as well as non-injurious to the color and quality of fabrics. The yellow ozokerite is used for the same reasons as the white ozokerite and for the further reasons that it is comparatively inexpensive and serves to impart to the composition a light tan color which is desirable in the treatment of fabrics. The mutton tallow is used principally to soften the composition so as to permit it to be easily applied to fabrics, the ozokerite being too hard in its natural state to be properly applied. Furthermore, it is inexpensive and slightly effective in increasing the waterproofing qualities of the composition. The cereate is used for practically the same reasons as the mutton tallow.

The improved composition of matter serves not only to render fabric water and moisture proof but also to "size" or "weight" the same, that is, to impart to it a good surface or finish, and to give it weight or body.

Having thus described the invention what is claimed as new is:

1. A composition of matter consisting of ozokerite, mutton tallow and cereate.

2. A composition of matter consisting of white ozokerite, mutton tallow and cereate.

3. A composition of matter consisting of white ozokerite, yellow ozokerite, mutton tallow and cereate.

4. A composition of matter consisting of seven parts of white ozokerite, one part of yellow ozokerite, one part of mutton tallow and one part of cereate.

In testimony whereof, I have signed my name to this specification in the presence of two subscribing witnesses, this 29th day of January 1906.

RICHARD FALTER.

Witnesses:
  HERBERT B. SMITH,
  O. GRANT ESTERBROOK.